(12) United States Patent
Nakamura

(10) Patent No.: US 6,960,749 B1
(45) Date of Patent: Nov. 1, 2005

(54) AUTOMATIC FOCUSING MECHANISM FOR MOUNTING ON MEASURING DEVICE

(75) Inventor: Yutaka Nakamura, Kanagawa-ken (JP)

(73) Assignee: Sokkia Co., Ltd., Tokyo (JP)

( * ) Notice: Subject to any disclaimer, the term of this patent is extended or adjusted under 35 U.S.C. 154(b) by 0 days.

(21) Appl. No.: 09/630,552

(22) Filed: Aug. 1, 2000

(51) Int. Cl.[7] .............................................. G02B 27/40

(52) U.S. Cl. .................................. 250/201.2; 359/426

(58) Field of Search ......................... 250/201.2, 201.4, 250/201.7; 356/4.03, 4.07, 4.08, 141.1, 141.2, 356/400, 401; 359/399, 410–412, 426; 396/75, 396/77, 88; 33/293

(56) References Cited

U.S. PATENT DOCUMENTS 5,742,378 A * 4/1998 Kumagai et al. ............ 356/4.08

OTHER PUBLICATIONS

Patent Abstracts of Japan: Inventor:Koji, et al., Jul. 23, 1993; "Pressurizing Device for Stress Cone".

* cited by examiner

Primary Examiner—Thanh X. Luu
(74) Attorney, Agent, or Firm—Arent Fox PLLC

(57) ABSTRACT

An automatic focusing mechanism for mounting on a measuring device has a telescope for sighting a leveling rod with pattern marks marked thereon at an equal pitch between each mark, and a photoelectric device for converting an image sighted by the telescope into an electric signal to thereby automatically adjust a focus on the leveling rod. The mechanism is made up of: a stepping motor for moving a focusing lens of the telescope from one end toward an opposite end of a movable range of the focusing lens; a microcomputer for obtaining the pitch of the pattern marks of the leveling rod at that position on the photoelectric device which is capable of obtaining the pitch in a state before the focusing lens is focused on the leveling rod to obtain a distance to the leveling rod based on the pitch obtained by the microcomputer; and fine adjusting mechanism for moving the focusing lens to a position corresponding to the distance.

3 Claims, 3 Drawing Sheets

AUTOMATIC FOCUSING MECHANISM FOR MOUNTING ON MEASURING DEVICE

BACKGROUND OF THE INVENTION

1. Field of the Invention

The present invention relates to an automatic focusing mechanism for mounting on (or integrating into) a measuring device such as an electronic level or the like, the mechanism having a telescope for sighting a leveling rod (or staff).

2. Description of the Related Art

Conventionally, as a measuring device of this kind, Published Examined Japanese Patent Application No. 184042/1993 discloses a level which is a measuring device provided with a telescope. The level sights, by the telescope, a leveling rod which has marked thereon bar codes. A comparison is then made between a bar code pattern which is stored in advance and the sighted bar code to thereby obtain a sighted position. The level is provided therein with a photoelectric device for converting the sighted image into an electric signal. A focusing lens for forming an image of the sighted image onto the photoelectric device is manually operated to thereby move the focusing lens in a back and forth direction.

This conventional measuring device has the following disadvantages. Namely, since the focusing operation must be performed manually, it takes time to finish the focusing operation. Furthermore, the time required to complete the focusing operation depends largely on the skill of a surveyor who performs the focusing operation. In the field of a camera or the like, there are known a plurality of automatic focusing mechanisms. In each of the automatic focusing mechanisms, an optical mechanism such as a sensor, mirror or the like which is specially prepared for the purpose in question is required. In order to add this kind of automatic focusing mechanism to the conventional measuring device, a large modification or addition to the conventional mechanism is required, resulting in an increase in the cost.

In view of the above-described problem, the present invention has an object of providing an automatic focusing mechanism which is capable of performing the focusing on the leveling rod without the necessity of large modification to the conventional measuring device.

SUMMARY OF THE INVENTION

In order to attain the above-described object, according to one aspect of the present invention, there is provided an automatic focusing mechanism for mounting on a measuring device having a telescope for sighting a leveling rod with pattern marks printed thereon at an equal pitch between each mark, and a photoelectric device for converting an image sighted by the telescope into an electric signal to thereby automatically adjust a focus on the leveling rod. The automatic focusing mechanism comprises: driving means for moving a focusing lens of the telescope from one end toward an opposite end of a movable range of the focusing lens; pitch computing means for obtaining the pitch of the pattern marks of the leveling rod at that position on the photoelectric device which is capable of obtaining the pitch in a state before the focusing lens is focused on the leveling rod to thereby obtain a distance to the leveling rod based on the pitch obtained by the pitch computing means; and fine adjusting means for moving the focusing lens to a position corresponding to the distance.

When the focusing lens is moved from one end to the opposite end within the movable range of the focusing lens, the focusing on the leveling rod gradually takes place. Once the focusing has proceeded to a certain degree, it becomes possible to obtain the pitch of the pattern marks of the leveling rod even if the leveling rod is not completely focused. Since the pitch of the leveling rod is constant and known in advance, it is possible to compute the distance to the leveling rod based on the obtained pitch. In other words, if the distance to the leveling rod is large, the pitch becomes small and, if the distance is short, the pitch becomes large. Once the distance to the leveling rod is thus obtained, that position of the focusing lens which corresponds to the distance to the leveling rod can be determined. Therefore, by moving the focusing lens to the position corresponding to the distance to the leveling rod, the focusing lens can be accurately brought into focus with the leveling rod.

The focusing lens is once moved to one end of the movable range and is then driven from that end to the opposite end. Generally speaking, the leveling rod is disposed at a position relatively far away from the measuring device. When a short distance is sighted by the telescope, the focal plane depth of the telescope is small. When a long distance is sighted, the focal plane depth becomes large. Therefore, preferably, the above-described one end of the movable range of the focusing lens is a position corresponding to an infinite distance, and the focusing lens is driven toward an objective lens to thereby obtain the pitch by the pitch computing means.

According to a second aspect of the present invention, there is provided an automatic focusing mechanism for mounting on a measuring device having a telescope for sighting a leveling rod with pattern marks printed thereon at an equal pitch between each mark, and a photoelectric device for converting an image sighted by the telescope into an electric signal to thereby automatically adjust a focus on the leveling rod. The mechanism comprises: driving means for moving a focusing lens of the telescope to a predetermined position within a movable range of the focusing lens; pitch computing means for obtaining the pitch of the pattern marks of the leveling rod on the photoelectric device to obtain a distance to the leveling rod based on the pitch obtained by the pitch computing means; and fine adjusting means for moving the focusing lens to a position corresponding to the distance.

In case where the leveling rod and the measuring device are set apart at a distance relatively larger than an intermediate distance, the focal plane depth becomes relatively large if the position of the focusing lens is moved to a predetermined position which covers a distance to be frequently set. Therefore, even if the focusing lens is not moved from one end of the movable range, the pitch of the pattern marks indicated on the leveling rod can be obtained, the practice of moving the focusing lens from one end of the movable range being the case with the first aspect of the present invention.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
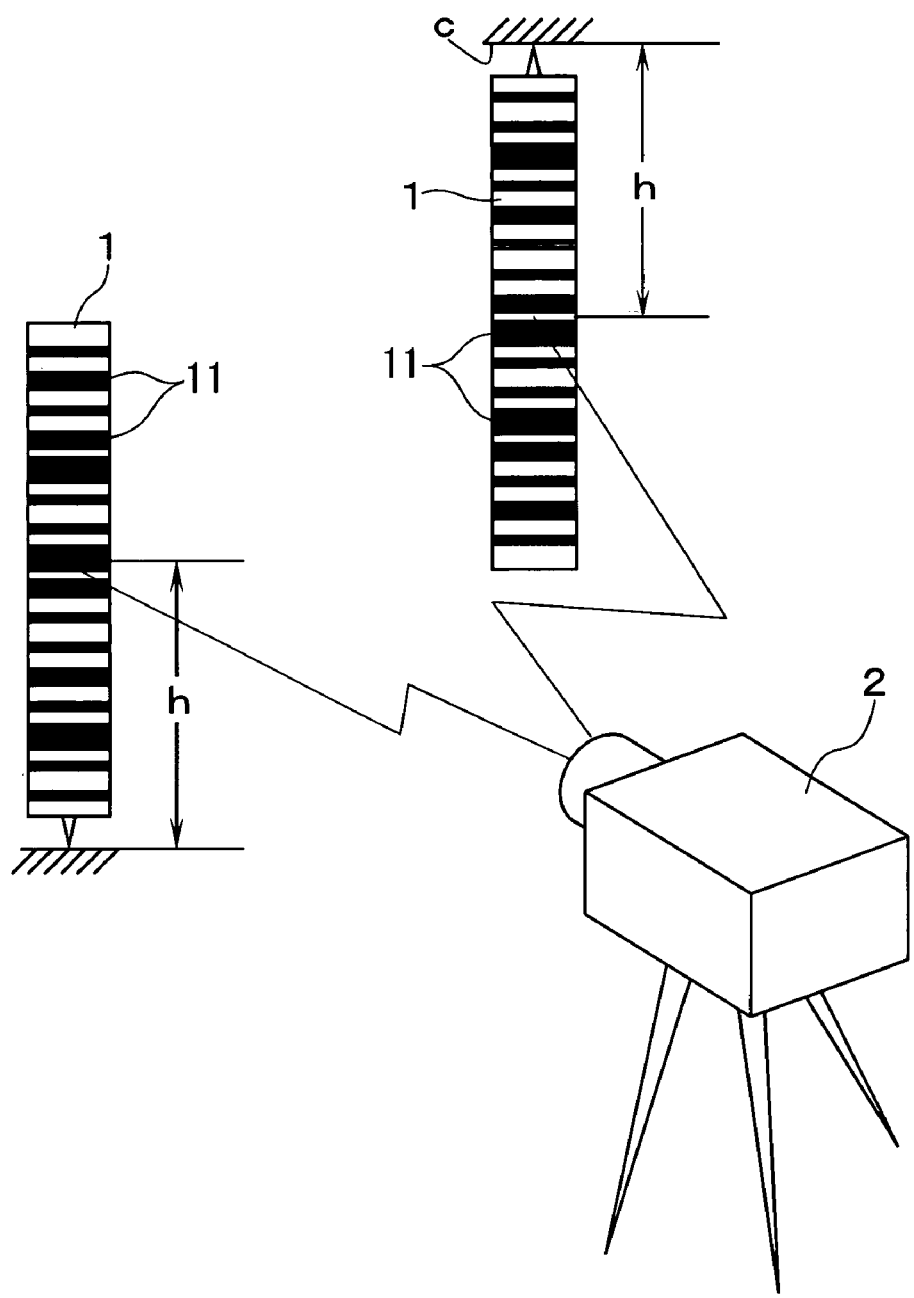
FIG. 1 is a perspective view showing a mode of using an electronic level.

With reference to FIG. 1, reference numeral 1 denotes a leveling rod (or a staff). This leveling rod 1 is sighted by an electronic level 2 which is provided with a telescope, thereby measuring the height "h" of the sighted position. The leveling rod 1 has a plurality of black bar marks 11 which are one example of pattern marks and which are disposed adjacent each other in a longitudinal direction along the leveling rod 1. The bar marks 11 are arranged in parallel with each other and perpendicular to the length of the levelling rod 1 at an equal pitch on a white surface of the leveling rod 1. The leveling rod 1 is ordinarily set on a floor or ground in its erected state (i.e., in an ordinary posture) as illustrated on the left side of FIG. 1. The leveling rod 1 is also sometimes set on a ceiling C in an inverted posture (i.e., upside down) as illustrated on the right side of FIG. 1. In case the leveling rod 1 is used in the inverted posture, the distance "h" from the ceiling C to the sighted position is measured. This distance is hereinafter also referred to as the height "h" of the sighted position in the same manner as in the case of measuring in the ordinary posture. Though not illustrated, numerals are printed on the backside of the leveling rod 1 so that an operator can use the leveling rod 1 also in case the sighting is made visually with his own eyes. Therefore, there is no possibility of mistaking the top end for the bottom end of the leveling rod 1. As hereinafter described in more detail, the dimensions of the widths (width dimensions) of the bar marks 11 as measured along the length of the leveling rod 1 are not equal to each other, but several kinds of widths are arranged in a predetermined order.

Figure 2:
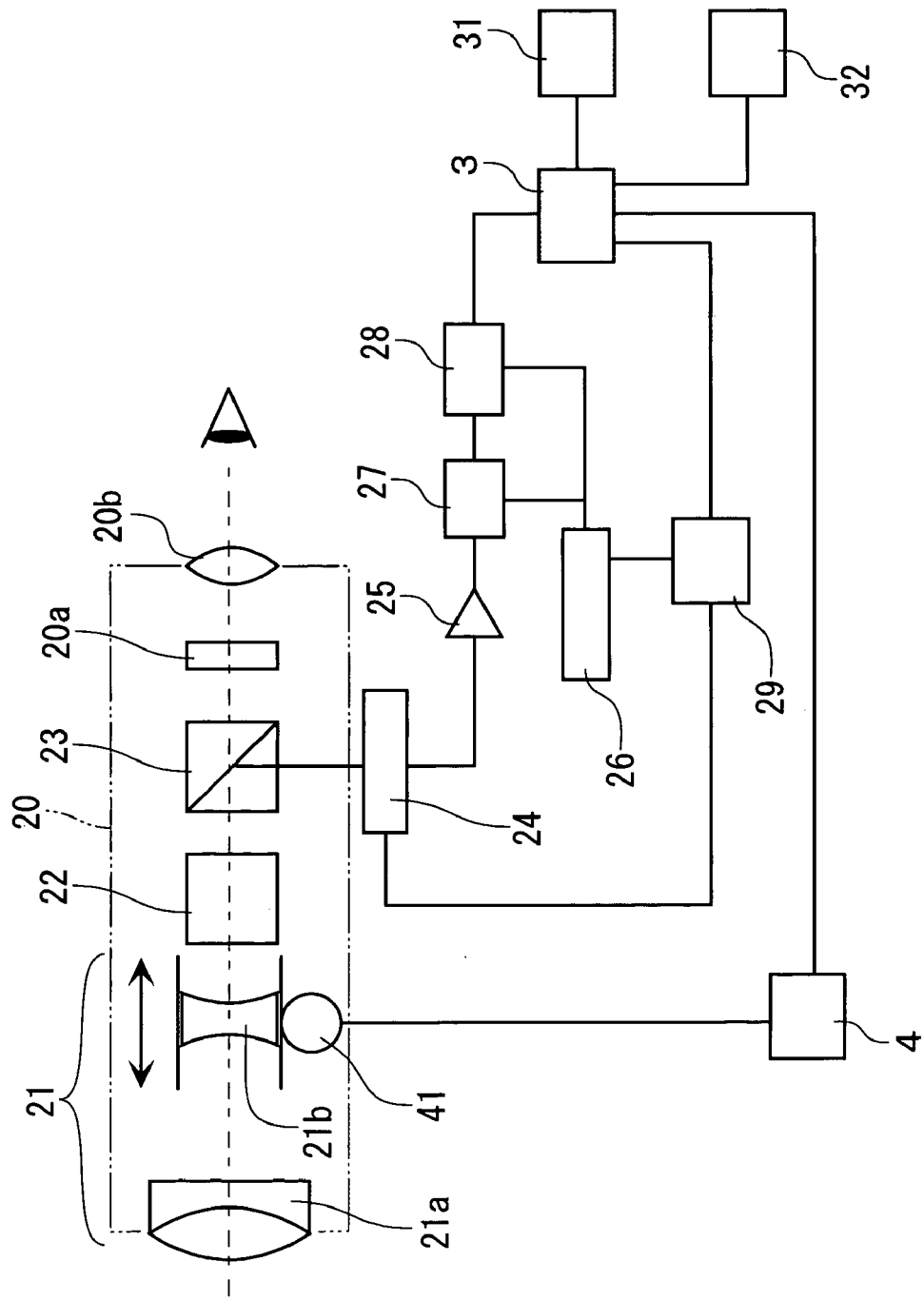
FIG. 2 is a block diagram showing the arrangement of the electronic level.

With reference to FIG. 2, the electronic level 2 is provided therein with a telescope 20. Inside this telescope 20, there are provided: an optical system 21 having an objective lens 21a and a focusing lens 21b; and an automatic tilt compensation mechanism (compensator) 22. An optically received image of the leveling rod 1 is split by a beam splitter 23 into a line sensor 24 which serves as a photoelectric device. The image to pass through the beam splitter 23 constitutes a sighting optical system, and the image split into the line sensor 24 constitutes an image optical system. The sighting optical system comprises the above-described optical system 21, the automatic tilt compensation mechanism 22, the beam splitter 23, a focus plate 20a, and an eyepiece 20b. The image optical system comprises the above-described optical system 21, the automatic tilt compensation mechanism 22, the beam splitter 23, and the line sensor 24. The line sensor 24 converts the optically received image of the leveling rod 1 into an electric signal and outputs it to an amplifier 25. The signal amplified by the amplifier 25 is sent to a sampling and holding means 27 in a manner synchronized with a clock signal of a clock driver 26. The signal held in the sampling and holding means 27 is converted to a digital signal by an A/D (analog/digital) converter. The signal converted to the digital signal is stored in a random access memory (RAM) 28. A microcomputer 3 determines the width dimension of each bar mark 11 on the basis of the signal stored in the RAM 28. The microcomputer 3 also determines the height "h" of the sighted position from the width dimensions of the marks 11 and a table value stored in advance in a read-only memory (ROM) 31. A driving circuit 29 is a circuit for controlling the operation of the line sensor 24. Since the optical axis of the sighting optical system and the optical axis of the image optical system are arranged to coincide with each other, the sighted position on the leveling rod 1 and the sighted position in the image optical system coincide with each other. The microcomputer 3 and the photoelectric device 24 constitute pitch computing means.

Figure 3A:
FIGS. 3A through 3C are graphs to show the changes in the output signal of a line sensor as a result of a movement of a focusing lens.
Figure 3B:
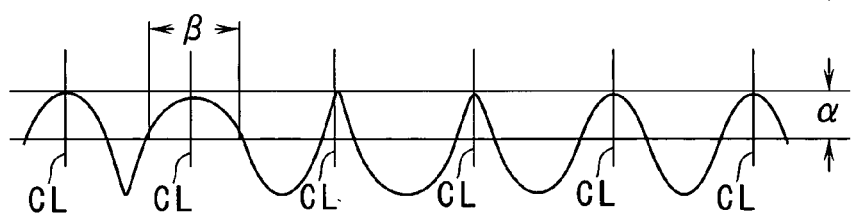
Figure 3C:
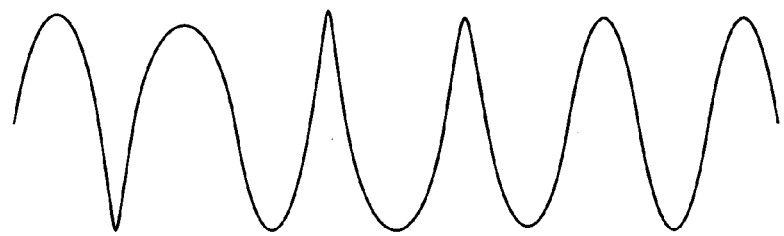

In case the leveling rod 1 is sighted, the focusing lens 21b must be moved along the optical axis to thereby have it focused on the leveling rod 1. To meet this requirement, in the present invention, the focusing lens 21b is provided with a stepping motor 41. This stepping motor 41 and a driving circuit 4 to be described hereinbelow constitute driving means for moving the focusing lens 21b. The stepping motor 41 and the focusing lens 21b are mechanically coupled to each other through a mechanism such as a rack and pinion mechanism or the like. It is thus so arranged that, by operating the stepping motor 41, the focusing lens 41 can automatically move along the optical axis. Numeral 4 denotes a driving circuit for the stepping motor 41. The operation of the stepping motor 41 is controlled by the microcomputer 3. The microcomputer 3 has connected thereto an automatic focusing button (not illustrated). The driving circuit 4, the stepping motor 41 and the microcomputer 3 constitute the fine adjusting means. When the automatic focusing button is pushed, the microcomputer 3 operates to once move the focusing lens 21b to an end on the side of the eye piece 20b within a movable range of the focusing lens 21b. In that state, the telescope 20 is in a state of being focused on a position of infinite distance. The image to be projected at this time onto the line sensor 24 is not clear enough to enable to specify or identify the leveling rod 1, but is generally vague. The output signal of the line sensor 24 becomes relatively flat as shown in FIG. 3A. The microcomputer 3 sets a range a based on the peak of the output signal of the line sensor 24. The microcomputer 3 then operates to move the focusing lens 21b toward the objective lens 21a until the output signal becomes larger than α. When the output signal of the line sensor 24 has exceeded the range a as shown in FIG. 3B, the movement of the focusing lens 21b is stopped once. The length β of the portion which lies or falls within the range a is obtained, and a center line CL which is the central position of the length β is obtained. The portions in which the output signal of the line sensor 24 lie within the range α appear at a plurality of points. Therefore, the position of the center line CL is obtained for each of the portions. If the distances between the respective center lines CL are averaged, the average value will correspond to that pitch of the bar marks 11 of the leveling rod 1 which appears on the image of the line sensor 24. The pitch becomes small when the distance to the leveling rod 1 is large. On the other hand, the pitch becomes large when the leveling rod 1 is set at a shorter distance. It follows that the distance between the electronic level 2 and the leveling rod 1 can be obtained based on the average value between each of the center lines CL. Once the distance to the leveling rod 1 has been obtained as described above, the microcomputer 3 operates to move the focusing lens 21b to a position which corresponds to the distance between the electronic level 2 and the leveling rod 1 to thereby accurately focus the focusing lens 21b on the leveling rod 1. Once the focusing lens 21b has thus been accurately focused on the leveling rod 1, the output signal of the line sensor 24 will be as shown in FIG. 3C. Thereafter, the height of the sighted position can be obtained in the procedures described, e.g., in the Japanese Patent Application No. 350620/1997.

In the above-described example, the value α is set. The following example may also be employed. Namely, the difference y of level in the density (or darkness) of the bar codes on the leveling rod is set for use in obtaining the distance between the electronic level 2 and the leveling rod 1. The difference larger than y is thus used to obtain the difference.

In the above-described embodiment, when the automatic focusing button is pushed, the focusing lens 21b is once moved to the end of the movable range and then the focusing lens 21b is moved from this end to the opposite end. In case where the distance between the electronic level 2 and the leveling rod 1 does not change much when the leveling rod 1 is moved from one survey point to another survey point, the following arrangement may be employed. Namely, the preceding focused position, i.e., that position of the focusing lens 21b which corresponds to the distance between the electronic level 2 and the leveling rod 1 right before the movement of the leveling rod 1 to the next survey point, is stored in memory. In sighting the leveling rod 1 which has been set in the next survey point, when the automatic focusing button is pushed, the focusing lens 21b is moved not to the end of the movable range, but to the above-described preceding focused position. Then, at this position, an average value between each of the center lines CL is obtained to −10 thereby focus the focusing lens 21b on the leveling rod 1 for the present surveying. Alternatively, the distance to the leveling rod is stored in memory at each time of surveying. The several distances thus stored are averaged to obtain an averaged distance. At the time of the next surveying, the focusing lens 21b is once moved to the position corresponding to the averaged distance.

As can be seen from the above-described explanations, according to the present invention, the focusing of the telescope in the measuring device can be automatically performed without newly adding a sensor.

It is readily apparent that the above-described automatic focusing mechanism for a measuring device meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly reference should be made to the following claims in determining the full scope of the invention.

What is claimed is:

1. An automatic focusing mechanism for mounting on a measuring device having a telescope for sighting a leveling rod with pattern marks marked thereon at an equal pitch between each mark, and a photoelectric device for converting an image sighted by said telescope into an electric signal with a set range to thereby automatically adjust a focus on the leveling rod, said mechanism comprising:
   driving means for moving a focusing lens of said telescope from one end toward an opposite end of a movable range of said focusing lens;
   pitch computing means for obtaining only the pitch of the pattern marks of the leveling rod at a position on said photoelectric device which is capable of obtaining the pitch in a state before said focusing lens is focused on the leveling rod to thereby obtain a distance to the leveling rod based only on the pitch obtained by said pitch computing means, without moving the focusing lens in a reciprocating motion around a focus point; and
   fine adjusting means for moving said focusing lens to a position corresponding to the distance.

2. The automatic focusing mechanism according to claim 1, wherein said one end of the movable range of said focusing lens is a position corresponding to an infinite distance, and wherein said focusing leans is driven toward an objective lens to thereby obtain the pitch by said pitch computing means.

3. An automatic focusing mechanism for mounting on a measuring device having a telescope for sighting a leveling rod with pattern marks marked thereon at an equal pitch between each mark, and a photoelectric device for converting an image sighted by said telescope into an electric signal with a set range to thereby automatically adjust a focus on the leveling rod, said mechanism comprising:
   driving means for moving a focusing lens of said telescope to a predetermined position within a movable range of said focusing lens;
   pitch computing means for obtaining only the pitch of the pattern marks of the leveling rod on said photoelectric device to obtain a distance to the leveling rod based only on the pitch obtained by said pitch computing means, without moving the focusing lens in a reciprocating motion around a focus point; and
   fine adjusting means for moving said focusing lens to a position corresponding to said distance.

* * * * *